United States Patent Office 3,592,845
Patented July 13, 1971

3,592,845
SEPARATION OF 2,3-DIHYDROXY-p-TOLUIC ACID FROM p-TOLUIC ACID
Peter Hosler, Wallingford, Pa., assignor to Sun Oil Company, Philadelphia, Pa.
No Drawing. Filed Aug. 30, 1967, Ser. No. 664,259
Int. Cl. C07c 65/04
U.S. Cl. 260—521                          3 Claims

ABSTRACT OF THE DISCLOSURE

A mixture of 2,3-dihydroxy-p-toluic acid and p-toluic acid can be separated by solvent extraction based on the finding that when these two acids, in their free acid form, are first extracted from an aqueous mixture of the same by a water-immiscible lower alkyl ester of a monocarboxylic acid, such as amyl acetate, and the resulting extract is then treated with an aqueous alkali solution to form a solvent phase and an aqueous phase, the 2,3-dihydroxy-p-toluic acid has a much higher affinity for the water phase than does the p-toluic acid. The dihydroxy acid may thus be selectively concentrated in the aqueous phase by repeated solvent-alkali treatments, while the p-toluic acid is recovered from the solvent phase.

BACKGROUND OF THE INVENTION

This invention relates to an improved method of separating by solvent extraction a mixture of 2,3-dihydroxy-p-toluic acid (hereinafter referred to as DHPT) and p-toluic acid (hereinafter referred to as PTA), said mixture having been formed, for example, by the fermentative action of certain selected species of microorganisms on p-xylene.

Heretofore, the separation and recovery of DHPT from PTA has involved a series of prolonged chemical steps comprising the esterification of the mixed acids with an alkanol such as methanol, followed by the fractional distillation of the resulting esters, a method which at best was time-consuming and costly on an industrial scale.

SUMMARY OF THE INVENTION

In accordance with the present invention it has now been found that DHPT may readily be separated from PTA by extracting an aqueous, acidified, mixture of these acids with a water-immiscible solvent comprising a lower alkyl ester of a monocarboxylic acid, as for example, amyl acetate, treating the resulting solvent extract with an aqueous alkali solution to form an aqueous phase containing all of the DHPT and some of the PTA, and a solvent phase containing the remainder of the PTA, and thereafter repeating the acidification, solvent extraction and aqueous alkali treatment of the aqueous phase until all of the DHPT has been distributed into the aqueous phase and all of the PTA distributed into the solvent phase. This separation of these two closely related materials is thus based on the unexpected discovery that DHPT has a much higher affinity for the resulting aqueous phase than does the parent acid, PTA, thereby providing a simple means for fractionating this mixture by solvent distribution.

DESCRIPTION OF THE INVENTION

The process of this invention is generally applicable to the separation of DHPT and PTA regardless of how the mixture is formed. However, mixtures of DHPT and PTA are most often produced by the fermentative action of selected microorganisms on p-xylene, and this process, in its preferred aspects, is applied to the treatment of such fermentation broths. One such fermentative method has been disclosed and claimed in earlier-filed application Ser. No. 509,621, filed on Nov. 24, 1965, now Pat. No. 3,383,289, in the name of Raymond et al., wherein p-xylene is oxidized by a species of Nocardia to form a mixture of DHPT and PTA. The proportions of these two acids in the final fermentation broth will vary widely, but generally will range from ratios of 1:1 to 1:5 parts by weight, or DHPT to PTA.

In applying the process of this invention to these fermentation products, the resulting fermentation broth should first be filtered or centrifuged in a conventional manner in order to remove the microbial cells and any other large particles of material. The pH of the filtrate should then be adjusted to a range of from about 1.5 to 3.5, and preferably about 2 with a strong mineral acid such as hydrochloric acid in order to insure that the DHPT and PTA are both in their free acid form.

To the filtered and acidified broth is then added the desired solvent comprising a lower alkyl ester of a monocarboxylic acid. Preferably, this solvent is amyl acetate, although such solvents as ethyl acetate, propyl acetate, butyl acetate, or the corresponding formates, or mixtures thereof and the like may likewise be employed. While the amount of solvent employed may vary widely in proportion to the amount of fermentation broth, economically there is no advantage to using more than about two parts, by volume, of solvent per part of aqueous broth.

A solvent phase containing substantially all of the DHPT and PTA, and an aqueous phase containing very minor amounts of both acids, are thus formed, and the two phases separated. The aqueous phase may be discarded, but desirably is recycled for further extraction with the solvent in order to recover additional small amounts of acid from the broth.

The solvent phase, which contains both acids, is then treated with an aqueous alkaline solution to form a second aqueous phase and solvent phase system. This time, however, substantially all of the DHPT, in its acid salt form, remains in the aqueous phase, together with lesser porportions of PTA, while the remaining PTA remains in the solvent phase.

The pH of the secondary aqueous alkaline extraction solution should be in the range of from about 7 to 11, and preferably from 9 to 10. Care should be taken that the pH not exceed about 11 since at higher pH's alkaline degradation of the DHPT occurs. The alkaline material used in this step is desirably sodium carbonate, although sodium hydroxide, potassium hydroxide or the like may be used if the concentration is carefully controlled to avoid excessively high pH values.

By repeating the treatment of the aqueous phase containing substantially all of DHPT and minor proportions of PTA with a mineral acid, organic solvent and an aqueous alkali solution as described hereinabove, there is eventually achieved a final and complete separation of all of the DHPT into an aqueous phase and all of the PTA into a solvent phase. Generally, from three to five extractions, depending upon the proportions of acids present in the fermentation broth, will suffice to separate completely the two acids.

The separated DHPT and PTA may then be conveniently recovered from their combined respective phases by any conventional means. Thus, the DHPT may be recovered from the combined aqueous extracts by precipitation with mineral acid, such as hydrochloric acid. The remaining soluble portion, approximately 2 gms./liter, may be recovered by extraction with a volatile solvent, such as ether, and evaporating to dryness. Similarly, the PTA may be recovered from the organic solvent phase by a simple distillation, in which the solvent is recovered for re-use, and the PTA is concentrated in the residue. The concentrate may then be extracted with aqueous sodium hydroxide, and the PTA precipitated with mineral acid.

The following examples serve to illustrate the invention but they are not intended to limit it thereto.

Example 1

The following example illustrates one method of forming a mixture of DHPT and PTA by the microbial oxidation of p-xylene:

This example illustrates the use of cells of *Nocardia salmonicolor* ATCC No. 19,149 under non-growth condition in the bio-oxidation of p-xylene. First, several batches of the cells were grown on n-hexadecane in a 40 l. fermentor at a pH of about 7 for 34 hours. The cells were recovered from the broth by centrifuging and then were suspended in a phosphate buffer solution containing only $Na_2HPO_4$ and $KH_2PO_4$ in amounts to maintain pH at about 8. No source materials for nitrogen or trace elements were present. Two batches of the cells in buffer solution were prepared having cell concentrations respectively of about 5 and 15 g./l. A fermentation of each batch at 30° C. was run under vortexing aeration conditions by continuously introducing to the suspension a 90:10 mixture of p-xylene: n-hexadecane at a rate such that the p-xylene concentration in the mixture was maintained at 200–300 p.p.m. In each run samples of the broth were taken at times of 16, 26 and 34 hours after the addition of p-xylene and were analyzed. Results were as follows:

| Cell conc., g./l. | Time from addition of p-xylene, hrs. | Product conc., g./l. DHPT | PTA |
|---|---|---|---|
| 5 | 16 | 0.5 | 0.8 |
|   | 26 | 0.5 | 1.3 |
|   | 34 | 0.5 | 2.1 |
| 15 | 16 | 1.3 | 2.3 |
|   | 26 | 1.5 | 5.4 |
|   | 34 | 1.8 | 6.6 |

These results show that appropriate strains of Nocardia can produce DHPT from p-xylene under non-growth conditions. In these instances the amount of PTA substantially exceeded the amount of DHPT that accumulated, but in fermentations under different conditions the relative proportions of these two types of products can be reversed. The data show that the amounts of products accumulated depend upon the concentration of cells used in the phosphate buffer medium.

Example 2

Nocardia salmonicolor ATCC No. 19,149 was grown in a 40 liter batch fermentor on mineral salts, urea and hexadecane at pH 7. After 80 hours the cell growth was 3% by volume. At the time the pH was adjusted to 8 and a feed of 75% p-xylene, 25% hexadecane was begun. Sixty-three hours after the start of the xylene feed, the broth was assayed for DHPT and PTA content based on ultra-violet adsorption measurements of solvent-extracted aliquots. The broth was initially found to contain 18 grams of DHPT (0.45 gram/liter) and 26 grams of PTA (0.65 gram/liter).

The fermentation was terminated, the broth clarified by centrifugation and the microbial cells discarded. The clear supernate was acidified to pH 2.0 with hydrochloric acid, then extracted with 20 liters of amyl acetate and the amyl acetate phase separated from the aqueous phase. The aqueous phase comprising the spent broth and containing only 1.6 grams of DHPT and 2.16 grams of PTA was discarded. The amyl acetate phase containing the balance of the two acids was then contacted with two liters of 5% aqueous sodium carbonate. An amyl acetate and an aqueous phase were again recovered; the aqueous concentrate, in a two-liter volume, contained 18.1 grams of DHPT and 14.9 grams of PTA, while the amyl acetate phase contained 9.0 grams of PTA, but no DHPT.

The aqueous phase containing the 18.1 grams of DHPT and 14.9 grams of PTA was again acidified with hydrochloric acid, extracted with ten liters of amyl acetate phase with two liters of 5% aqueous sodium carbonate. The aqueous phase was found to contain 18.1 grams of DHPT and 9.8 grams of PTA; the amyl acetate phase contained 4.5 grams of PTA, and no DHPT.

Treatment of the aqueous phase with hydrochloric acid, amyl acetate, and sodium carbonate was repeated until assays showed no PTA remaining in the aqueous phase. The individual aqueous and solvent portions containing the DHPT and PTA respectively were then combined. The DHPT was precipitated from the aqueous solution by acidification with hydrochloric acid followed by filtration. The PTA was recovered by distilling the amyl acetate, extracting the residue with aqueous sodium hydroxide, and precipitating the PTA from the resulting concentrate with hydrochloric acid.

While the foregoing example has been described in terms of batch treatment of both the fermentation broth and the individual organic and aqueous phases, it will be appreciated that by the routine application of known techniques and apparatus that a continuous separation process whereby the DHPT is continuously recovered from the aqueous phase and the PTA from the organic phase may readily be effected.

What is claimed is:

1. A process for the separation of a mixture of 2,3-dihydroxy - p - toluic acid and p - toluic acid which comprises (1) acidifying an aqueous mixture of said acids until a pH of about 1.5 to 3.5 is obtained; (2) extracting said acidified mixture with the solvent amyl acetate to form an aqueous phase and a solvent phase; (3) separating said phases and adjusting the pH of the solvent phase to about pH 7 to 11 by adding an aqueous solution of an alkali to said solvent phase to form a further aqueous phase and solvent phase; (4) separating said phases and reacidifying said latter aqueous phase and recontacting said aqueous phase with said amyl acetate solvent, and recontacting the resulting solvent phase with said aqueous alkali solution; (5) thereafter repeating each of the foregoing steps a sufficient number of times until substantially all of the 2,3-dihydroxy-p-toluic acid is recovered in the aqueous phase and substantially all of the p-toluene acid is recovered in the solvent phase.

2. The process according to claim 1 wherein the alkali is sodium carbonate.

3. The process according to claim 1 wherein the mixture of acids was formed by the microbial oxidation of p-xylene.

References Cited

UNITED STATES PATENTS 2,996,540   8/1961   Pearl _____ 260—521

OTHER REFERENCES

Handbook of Chemistry & Physics, 49th ed., Chemical Rubber Publishing Co., pp. 173–174.

Vogel., Practical Organic Chem., pp. 149–150.

CHARLES B. PARKER, Primary Examiner

E. J. GLEIMAN, Assistant Examiner

U.S. Cl. X.R.

195—51; 260—515, 525